United States Patent
Nair et al.

(10) Patent No.: US 8,346,748 B1
(45) Date of Patent: Jan. 1, 2013

(54) ENVIRONMENT CLASSIFICATION AND SERVICE ANALYSIS

(75) Inventors: Manoj Nair, Cary, NC (US); Iva Blazina Vukelja, Everett, MA (US); Arun Dugganapally, Charlestown, MA (US); Stephen R. Perrin, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 11/694,753

(22) Filed: Mar. 30, 2007

Related U.S. Application Data

(60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 17/00* (2006.01)

(52) U.S. Cl. ........ 707/706; 707/749; 707/791; 707/795; 707/960

(58) Field of Classification Search .......... 707/706, 707/749, 791, 795, 960
See application file for complete search history.

(56) References Cited

U.S. PATENT DOCUMENTS

| | | | |
|---|---|---|---|
| 6,003,040 A | 12/1999 | Mital et al. | |
| 6,167,445 A | 12/2000 | Gai et al. | |
| 6,308,216 B1 | 10/2001 | Goldszmidt et al. | |
| 6,349,297 B1 | 2/2002 | Shaw et al. | |
| 6,363,053 B1 | 3/2002 | Schuster et al. | |
| 6,430,613 B1 | 8/2002 | Brunet et al. | |
| 6,591,300 B1 | 7/2003 | Yurkovic | |
| 6,633,312 B1 * | 10/2003 | Rochford et al. | 715/736 |
| 6,865,728 B1 | 3/2005 | Branson et al. | |
| 7,185,073 B1 * | 2/2007 | Gai et al. | 709/221 |
| 7,278,156 B2 | 10/2007 | Mei et al. | |
| 7,363,292 B2 | 4/2008 | Chaboche | |
| 7,543,020 B2 | 6/2009 | Walker et al. | |
| 7,548,915 B2 | 6/2009 | Ramer et al. | |
| 7,580,357 B2 | 8/2009 | Chang et al. | |
| 7,613,806 B2 | 11/2009 | Wright et al. | |
| 7,616,642 B2 | 11/2009 | Anke et al. | |
| 7,725,570 B1 | 5/2010 | Lewis | |
| 7,725,571 B1 | 5/2010 | Lewis | |
| 7,730,172 B1 | 6/2010 | Lewis | |

(Continued)

FOREIGN PATENT DOCUMENTS

WO WO 2008/036621 3/2008

OTHER PUBLICATIONS

U.S. Appl. No. 11/692,051, filed Mar. 27, 2007, Perrin et al.

(Continued)

*Primary Examiner* — Sana Al Hashemi
(74) *Attorney, Agent, or Firm* — Workman Nydegger

(57) ABSTRACT

Discovering environment objects for information management in a networked environment. Information management provides services such as data protection, backup, retention, compliance, etc., by classifying the objects and/or infrastructure of an entity according to its value to the entity. Information management begins by discovering the data in a network and by discovering the servers and services operating in a network. The servers and services are discovered using adapters that can collect information regarding the environment objects. This information can then by used by information management systems to assign or orchestrate various services.

10 Claims, 6 Drawing Sheets

U.S. PATENT DOCUMENTS

| | | | |
|---|---|---|---|
| 7,734,765 | B2 | 6/2010 | Musman et al. |
| 7,739,239 | B1 | 6/2010 | Cormie et al. |
| 2002/0016800 | A1* | 2/2002 | Spivak et al. ................ 707/523 |
| 2002/0091746 | A1 | 7/2002 | Umberger et al. |
| 2002/0161883 | A1 | 10/2002 | Matheny et al. |
| 2003/0023587 | A1 | 1/2003 | Dennis et al. |
| 2003/0023712 | A1 | 1/2003 | Zhao et al. |
| 2003/0036886 | A1 | 2/2003 | Stone |
| 2003/0041050 | A1 | 2/2003 | Smith et al. |
| 2003/0093528 | A1 | 5/2003 | Rolia |
| 2003/0140009 | A1 | 7/2003 | Namba et al. |
| 2003/0167180 | A1 | 9/2003 | Chung et al. |
| 2003/0196108 | A1 | 10/2003 | Kung |
| 2003/0212778 | A1 | 11/2003 | Collomb |
| 2003/0233391 | A1 | 12/2003 | Crawford et al. |
| 2003/0233464 | A1 | 12/2003 | Walpole et al. |
| 2003/0236904 | A1 | 12/2003 | Walpole et al. |
| 2004/0060002 | A1 | 3/2004 | Lucovsky et al. |
| 2004/0098415 | A1 | 5/2004 | Bone et al. |
| 2004/0215650 | A1 | 10/2004 | Shaji et al. |
| 2005/0071182 | A1 | 3/2005 | Aikens et al. |
| 2005/0125768 | A1 | 6/2005 | Wong et al. |
| 2005/0131982 | A1 | 6/2005 | Yamasaki et al. |
| 2005/0132034 | A1 | 6/2005 | Iglesia et al. |
| 2005/0177545 | A1 | 8/2005 | Buco et al. |
| 2005/0197852 | A1 | 9/2005 | Gebhard et al. |
| 2005/0251533 | A1 | 11/2005 | Harken et al. |
| 2005/0262097 | A1 | 11/2005 | Sim-Tang et al. |
| 2005/0273451 | A1 | 12/2005 | Clark et al. |
| 2006/0015388 | A1 | 1/2006 | Flockhart et al. |
| 2006/0036463 | A1 | 2/2006 | Patrick et al. |
| 2006/0092861 | A1 | 5/2006 | Corday et al. |
| 2006/0095543 | A1 | 5/2006 | Ito et al. |
| 2006/0101084 | A1 | 5/2006 | Kishi et al. |
| 2006/0106782 | A1 | 5/2006 | Blumenau et al. |
| 2006/0112108 | A1 | 5/2006 | Eklund et al. |
| 2006/0114832 | A1 | 6/2006 | Hamilton et al. |
| 2006/0179143 | A1 | 8/2006 | Walker et al. |
| 2006/0236061 | A1 | 10/2006 | Koclanes |
| 2006/0248165 | A1 | 11/2006 | Sridhar et al. |
| 2006/0248187 | A1 | 11/2006 | Thorpe et al. |
| 2007/0038683 | A1 | 2/2007 | Dixon et al. |
| 2007/0055689 | A1 | 3/2007 | Rhoads et al. |
| 2007/0058632 | A1 | 3/2007 | Back et al. |
| 2007/0061363 | A1 | 3/2007 | Ramer et al. |
| 2007/0070894 | A1 | 3/2007 | Wang et al. |
| 2007/0083875 | A1 | 4/2007 | Jennings |
| 2007/0103984 | A1 | 5/2007 | Kavuri et al. |
| 2007/0104208 | A1 | 5/2007 | Svensson |
| 2007/0127370 | A1 | 6/2007 | Chang et al. |
| 2007/0153802 | A1 | 7/2007 | Anke et al. |
| 2007/0192352 | A1 | 8/2007 | Levy |
| 2007/0208751 | A1 | 9/2007 | Cowan et al. |
| 2007/0226228 | A1 | 9/2007 | Her et al. |
| 2007/0294406 | A1 | 12/2007 | Suer et al. |
| 2007/0299828 | A1 | 12/2007 | Lewis et al. |
| 2008/0002678 | A1 | 1/2008 | Klessig et al. |
| 2008/0005086 | A1 | 1/2008 | Moore |
| 2008/0021850 | A1 | 1/2008 | Irle et al. |
| 2008/0049642 | A1 | 2/2008 | Gudipudi et al. |
| 2008/0071726 | A1 | 3/2008 | Nair et al. |
| 2008/0071727 | A1 | 3/2008 | Nair et al. |
| 2008/0071813 | A1 | 3/2008 | Nair et al. |
| 2008/0071908 | A1 | 3/2008 | Nair et al. |
| 2008/0077682 | A1 | 3/2008 | Nair et al. |
| 2008/0077995 | A1 | 3/2008 | Curnyn et al. |
| 2008/0097923 | A1 | 4/2008 | Kim et al. |
| 2008/0114725 | A1 | 5/2008 | Indeck et al. |
| 2008/0134043 | A1 | 6/2008 | Georgis et al. |
| 2008/0177994 | A1* | 7/2008 | Mayer ................ 713/2 |
| 2008/0301760 | A1* | 12/2008 | Lim ................ 726/1 |
| 2009/0077210 | A1 | 3/2009 | Musman et al. |
| 2009/0150431 | A1 | 6/2009 | Schmidt et al. |
| 2009/0157881 | A1 | 6/2009 | Kavuri et al. |

OTHER PUBLICATIONS

U.S. Appl. No. 11/692,058, filed Mar. 27, 2007, Perrin et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell, II.
U.S. Appl. No. 11/772,192, filed Jun. 30, 2007, Nair et al.
U.S. Appl. No. 11/528,900, Jun. 9, 2008, Office Action.
U.S. Appl. No. 11/528,772, Sep. 12, 2008, Pre-Interview First Office Action.
U.S. Appl. No. 11/528,783, Nov. 7, 2008, Pre-Interview First Office Action.
U.S. Appl. No. 11/528,898, Sep. 5, 2008, Pre-Interview First Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/528,783, Jan. 15, 2010, Office Action.
U.S. Appl. No. 11/528,772, Jan. 28, 2010, Office Action.
U.S. Appl. No. 11/692,058, Jan. 8, 2010, Final Office Action.
U.S. Appl. No. 11/528,898, Oct. 7, 2009, Final Office Action.
U.S. Appl. No. 11/864,596, Nov. 12, 2009, Office Action.
U.S. Appl. No. 11/692,051, Feb. 19, 2010, Notice of Allowance.
U.S. Appl. No. 11/694,764, Jan. 28, 2010, Office Action.
U.S. Appl. No. 11/772,179, Feb. 23, 2010, Final Office Action.
U.S. Appl. No. 11/864,770, Nov. 27, 2009, Office Action.
U.S. Appl. No. 11/864,760, Nov. 24, 2009, Office Action.
U.S. Appl. No. 11/864,605, Jan. 14, 2010, Office Action.
U.S. Appl. No. 11/528,772, Jun. 3, 2009, Final Office Action.
U.S. Appl. No. 11/528,783, Jun. 25, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/692,051, Aug. 26, 2009, Office Action.
U.S. Appl. No. 11/772,179, Aug. 19, 2009, Office Action.
U.S. Appl. No. 11/772,192, Oct. 29, 2010, Final Office Action.
U.S. Appl. No. 11/864,605, Nov. 4, 2010, Office Action.
U.S. Appl. No. 11/864,770, Nov. 3, 2010, Office Action.
U.S. Appl. No. 11/528,772, Mar. 3, 2011, Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/864,764, Jan. 27, 2011, Office Action.
U.S. Appl. No. 11/528,900, Jan. 23, 2009, Final Office Action.
U.S. Appl. No. 11/528,783, Feb. 24, 2009, Office Action.
U.S. Appl. No. 11/528,898, Feb. 9, 2009, First Action Interview.
U.S. Appl. No. 11/528,898, Apr. 3, 2009, Office Action.
U.S. Appl. No. 11/694,783, Feb. 6, 2009, Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/692,051, Mar. 31, 2010, Notice of Allowance.
U.S. Appl. No. 11/692,058, Jul. 6, 2010, Office Action.
U.S. Appl. No. 11/694,764, Aug. 4, 2010, Final Office Action.
U.S. Appl. No. 11/772,192, Apr. 15, 2010, Office Action.
U.S. Appl. No. 11/864,596, May 26, 2010, Final Office Action.
U.S. Appl. No. 11/864,605, May 28, 2010, Final Office Action.
U.S. Appl. No. 11/864,760, Apr. 7, 2010, Final Office Action.
U.S. Appl. No. 11/864,760, Jul. 27, 2010, Office Action.
U.S. Appl. No. 11/864,770, Apr. 21, 2010, Final Office Action.
U.S. Appl. No. 13/414,512, filed Mar. 7, 2012, Nair et al.
U.S. Appl. No. 11/528,772, mailed Oct. 27, 2011, Notice of Allowance.
U.S. Appl. No. 11/528,783, mailed Feb. 14, 2012, Office Action.
U.S. Appl. No. 11/528,790, mailed Jan. 23, 2012, Office Action.
U.S. Appl. No. 11/528,898, mailed Mar. 1, 2012, Office Action.
U.S. Appl. No. 11/694,764, mailed Sep. 26, 2011, Final Office Action.
U.S. Appl. No. 11/772,179, mailed Mar. 29, 2012, Office Action.
U.S. Appl. No. 11/772,192, mailed Jan. 5, 2012, Office Action.

U.S. Appl. No. 11/772,192, mailed Jun. 12, 2012, Final Office Action.
U.S. Appl. No. 11/864,596, mailed Oct. 7, 2011, Final Office Action.
U.S. Appl. No. 11/864,770, mailed Apr. 19, 2011, Final Office Action.
U.S. Appl. No. 11/864,764, mailed Aug. 29, 2011, Final Office Action.
U.S. Appl. No. 11/864,764, mailed May 3, 2012, Office Action.
U.S. Appl. No. 11/864,774, mailed May 11, 2011, Office Action.
U.S. Appl. No. 11/864,774, mailed Dec. 9, 2011, Final Office Action.
U.S. Appl. No. 11/528,783, mailed Aug. 15, 2012, Final Office Action.
U.S. Appl. No. 11/528,790, mailed Jul. 18, 2012, Final Office Action.
U.S. Appl. No. 11/528,898, mailed Oct. 2, 2012, Final Office Action.
U.S. Appl. No. 11/694,764, mailed Aug. 1, 2012, Final Office Action.
U.S. Appl. No. 11/864,605, mailed Jul. 3, 2012, Final Office Action.

* cited by examiner

ENVIRONMENT CLASSIFICATION AND SERVICE ANALYSIS

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND OF THE INVENTION

1. The Field of the Invention

The present invention relates to information management. More particularly, embodiments of the invention relate to systems and methods for automated discovery of environment objects operating in a network including the acquisition of knowledge by discovering and applying classification techniques to the environment objects.

2. The Relevant Technology

The world is slowly and continually moving from being paper-based to being electronic-based and this is becoming apparent in a wide variety of different systems. Businesses, schools, and even home life are transitioning to electronic systems. For example, email is becoming a primary means of communication rather than sending regular mail. Bills are paid online. Airlines often prefer electronic ticketing and online check-in. The list goes on. There are several reasons for this transition, one of which is the convenience and accessibility of electronic systems. Email, for example, often arrives shortly after sending it.

As entities become more centered on electronic data, the ability to manage the electronic data becomes crucial for a wide variety of different reasons. Much of the electronic data maintained by an entity or organization often relates to different aspects of the entity and often is subject to various considerations. For example, much of the data of an entity may be dependent on the entity's current business. Data related to a new and upcoming product, for example, may be business critical that should be safeguarded in various ways. At the same time, the entity may have older data about a product being phased out that is no longer subject to the same safeguards.

More generally, there are a number of different factors that may determine how certain data is handled or that determine the services that are needed for the data. Some of the factors or considerations include data security, data backup, data retention, data access control, regulatory compliance, corporate compliance, and the like or any combination thereof. Further, much of the data is unstructured at least in the sense that the data's value to the entity is not readily known and thus the services required for the data is not necessarily known.

For example, an entity may have a file storage system that it backs up on a regular basis. However, there may be many files on the file storage system that have little or no value to the entity. As a result, the entity is often paying for services that are not required. Perhaps more importantly, there may be content in the file storage system that is not receiving sufficient service.

In other words, one of the problems faced by users is related to being able to better identify services that are required. As discussed above, current users often have too much or to little services. In the latter case, companies are at risk, for example, if they do not apply retention and protection to all the files that need it, like files with personal information about employees. But not all such files are recognized as such and are not getting the right services.

As a result, there is clearly a need in the industry to enable an entity or user to properly identify and seek the right service levels for the entity's data. At the same time, there is also a need to be able to provide data classification and data reporting, even if existing service levels are not changed. The ability to simply classify data would enable entities to better evaluate the value of their data.

For example, the unstructured nature of most systems often makes it difficult to ensure that the proper services are sought. However, making decisions on how to manage the data of an entity is often further complicated by the organization of the entity irrespective of the data. For example, any given entity typically has more than one "line of business." An engineering firm that performs contract work for the government, for instance, often has data that is associated with the engineering being performed. At the same time, the engineering firm may also have data that is associated with the legal department or corporate aspect of the engineering firm, data that is associated with human resources, and the like. In other words, a given entity often has various domains of data or different shares of data, some of which may be shared by the various lines of business.

In each line of business, there is often data that may be subject to certain requirements that are different from requirements that exist with respect to data in the other lines of business. Further, each line of business may have a different way of referring to types of data. All of these differences combine to make providing information management a complex and difficult process.

In today's world, entities are faced with questions such as identifying the levels of security or retention that apply to various files or needing to know which data is critical to the business. Entities must also account for the effects of time on certain data. Data that is associated with a cancelled project, for example, may no longer require certain services. In addition, entities would like to be able to better value their existing data.

One of the failures of conventional systems is related to their failure to understand and account for their network. A network, for example, may want to secure multiple levels of storage. If the service provider is unaware of such storage on a network, however, then it may be unable to provide the needed service. Further, it is not practical to manually assign objects to the various service levels because of the sheer number of objects that are typically present in a network. This is one of the reasons that most systems either provide too much or too little protection because of their inability to understand the environment in an automated fashion that can account for differences between the network's objects that often have an impact of the service levels required.

In sum, the data of an entity is an important asset and should be properly safeguarded. This means that services such as back, retention, encryption, etc., need to be obtained and orchestrated such that entities have neither too little or too much services for their data. As indicated above, conventional systems do not enable entities to effectively manage their data. As a result, these entities either have too much or too little protection for their data. Entities need a way to manage their data so as to comply with all relevant requirements without purchasing too many services and without providing insufficient services. Entities also need a way to manage their data in an ongoing manner as conditions in the entity change.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
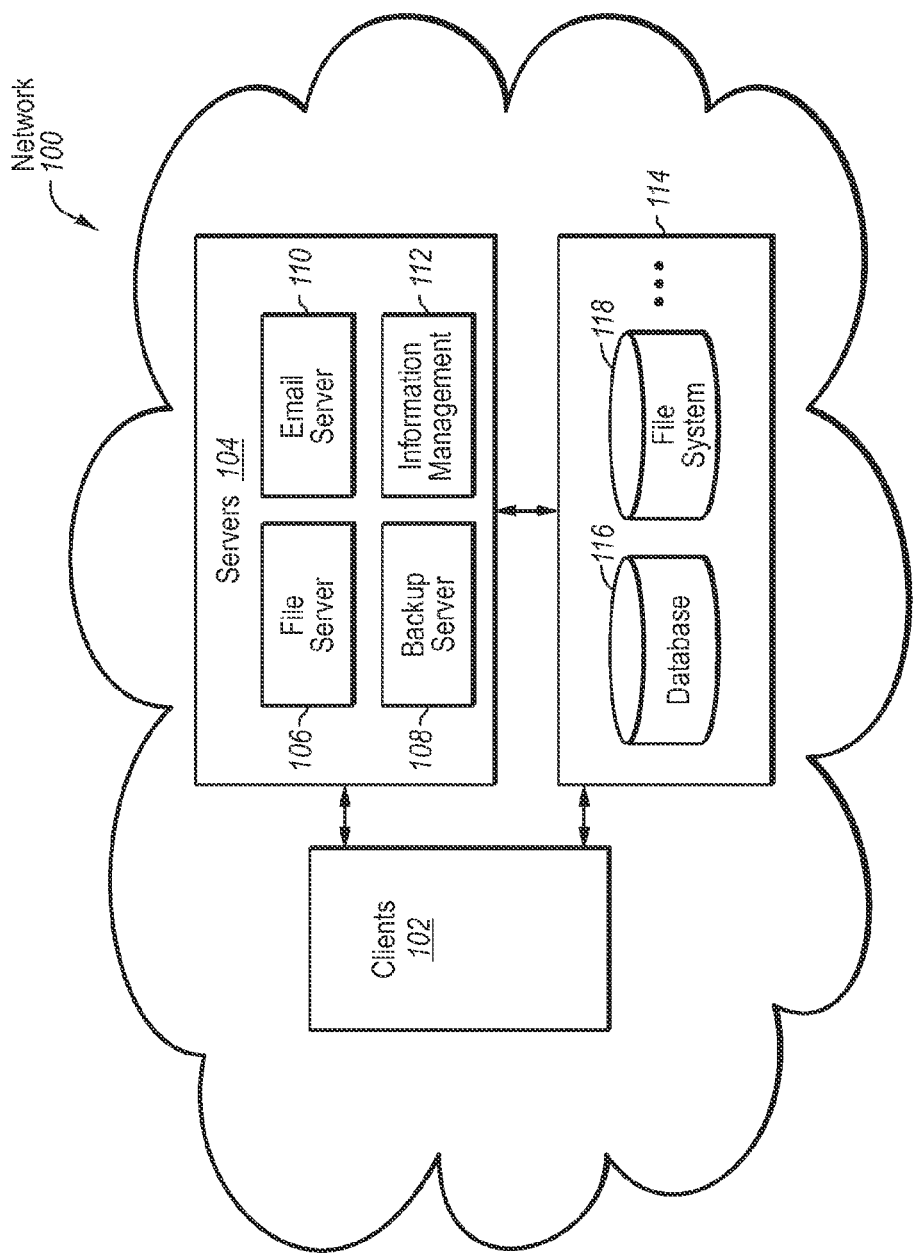
FIG. 1 illustrates an exemplary environment for implementing embodiments of the invention.

Embodiments of the invention relate to information or data management and more particularly to systems and methods for acquiring information describing environment that may include objects including servers, systems, and services. The discovery of environment objects provides information that can be used to better provide or better orchestrate information management. The discovery of environment objects also enables an entity to better value its data.

I. Information Management

Information management enables the orchestration and/or identification of services such as data protection, data placement, corporate compliance, and others based on the value of the underlying data and/or based on the environment in which the data exists. The ability of information management to orchestrate and/or provide these services is related to the ability of the information management system to understand the environment in which the services are required. Embodiments of the invention include the acquisition of this knowledge by discovering environment objects. In some embodiment, the acquisition of knowledge also includes applying classification techniques to environment objects such as servers or systems.

This knowledge needed to identify and/or orchestrate the appropriate services can be obtained through discovery of the network, which provides the information management system with an understanding of the relationships that may exist between the various servers (and other devices) on the network and the data that is accessible over the network and the applications or services operating therein. The discovery of a network provides an information management system with information that can be used to classify the network as well as the data in the network.

After the network (infrastructure and/or data) has been discovered, it is useful to classify the data and/or the infrastructure that is present in the network. Classification is a process that enables each object to be grouped with other objects or be examined in a manner that enables the needed services for that object to be identified. As used herein, an object can be any data (e.g., a file, a directory, a folder), server, service, or the like in the network Objects can also be identified in the context of a stand alone computer.

Classification typically assigns each object to one or more categories. Once classification is complete, service level management is performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather that pay for services that may not be needed. Further, unstructured data is categorized and can be provided with the services based on its value to the entity. In one embodiment, classification is a way for an entity to automatically place a value on the various objects of data.

Information management is also a process that can be ongoing. In most networks, objects are continually added to a network and those objects typically require certain services. In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

II. Network Environment

FIG. 1 illustrates an exemplary environment for implementing embodiments of the invention. FIG. 1 is intended to illustrate that, while many systems often have similar functions, the actual implementation from one network to the next can vary significantly. The variability in network configurations is one of the aspects that have hindered conventional attempts at information management. The variability may be related, for example, to the type of software installed, the hardware selected for the network, the configuration of the hardware/software and the like. As previously described, this is one of the reasons that discovery of a network is not limited to the objects in the network but also includes discovery of the servers and services that are operating in the network. An understanding of the services and services can improve the ease and accuracy with which objects are classified.

In this example, the system 100 represents a network such as a local area network, a wide area network, and the like or any combination thereof. The connections in the system or network 100 can be wired and/or wireless. In this case, the network 100 typically includes clients 102 that have access to various servers 104 and to data 114. Various services are typically provide by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the network 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

III. Discovery of the Environment

Information management according to embodiments of the invention has several components that work together to provide an understanding of the value of an entity's information. Information management also reduces various risks (such as non-compliance) often associated with unstructured data. As described below, embodiments of the invention provide a system for classifying objects such that the appropriate services can be provided to the entity's data. Embodiments of the invention also enables services that are required by an entity to be effectively identified and orchestrated. Examples of the services often required by entities includes backup services, retention services, corporate compliance services, regulatory compliance, data accessibility, data deletion, and the like or any combination thereof.

Figure 2:
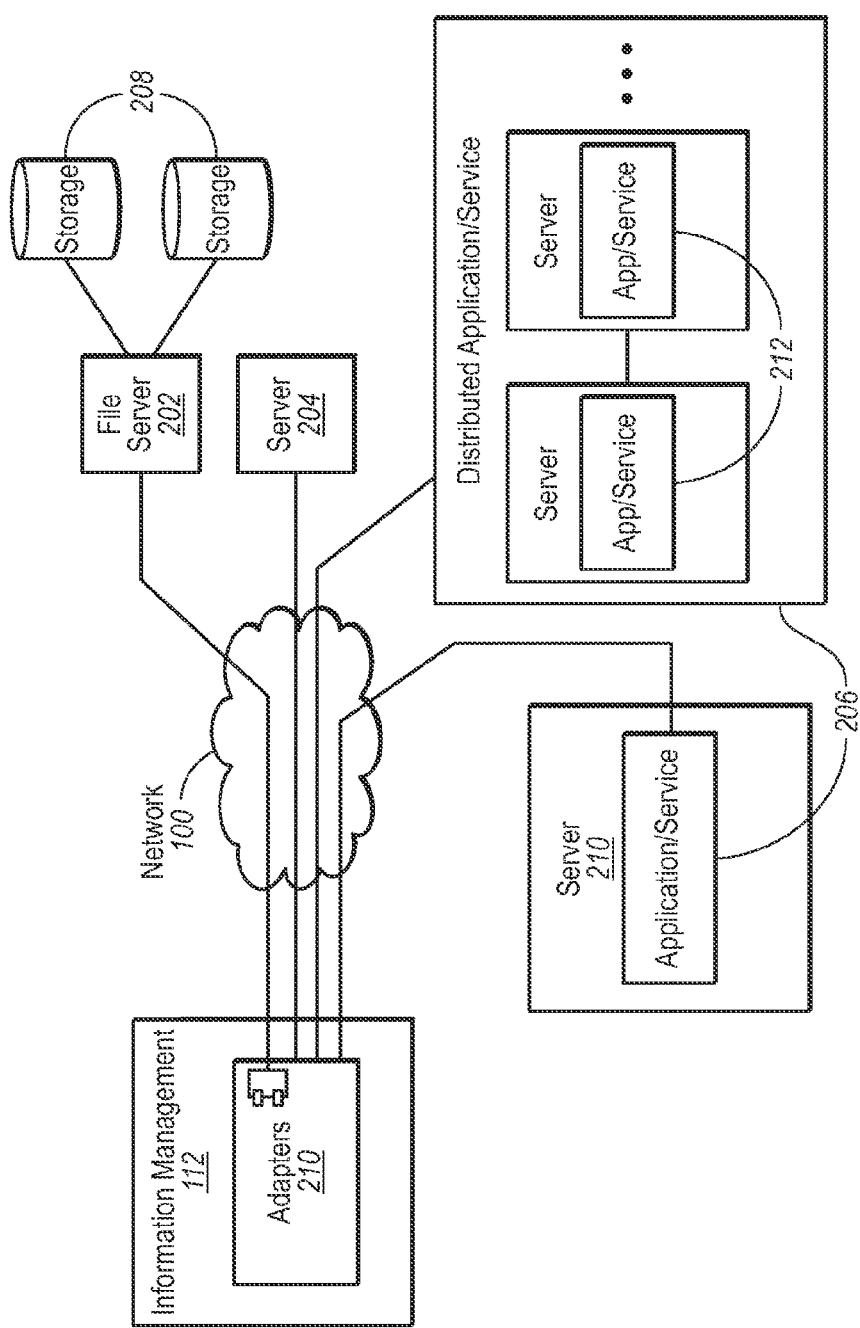
FIG. 2 illustrates one embodiment of a systems for discovering environment objects including servers and services in a network.
Figure 3:
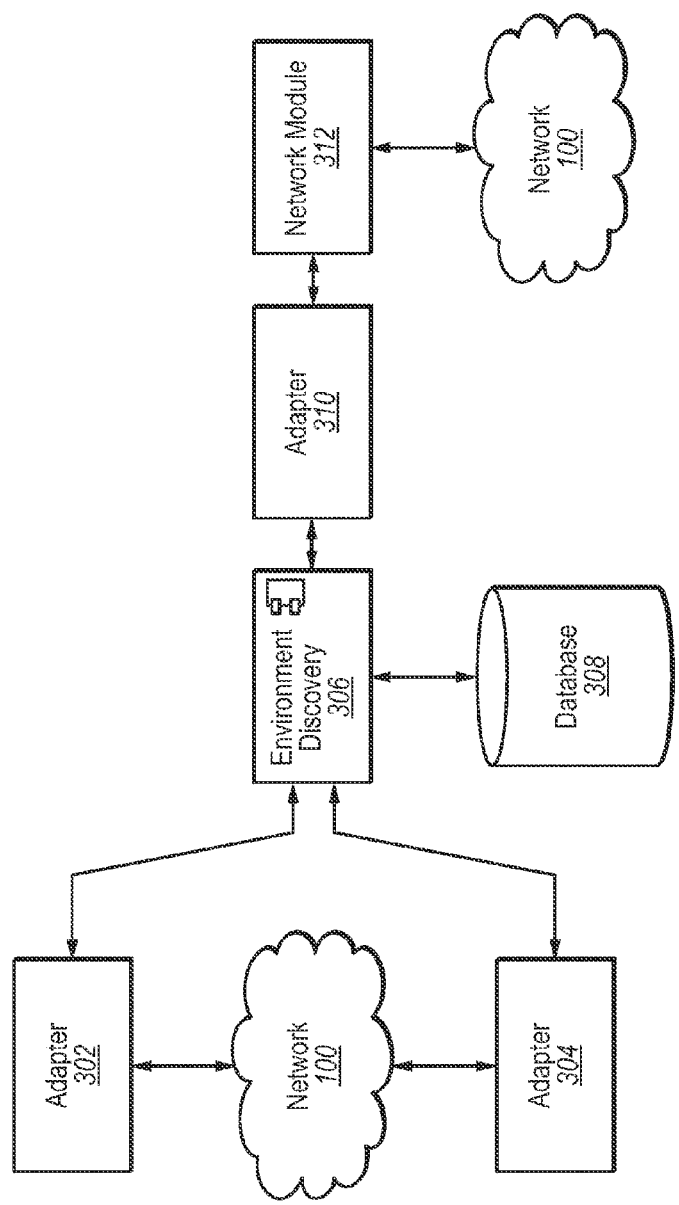
FIG. 3 illustrates a discovery module that uses multiple adapters to discover environment objects in a network.
Figure 4:
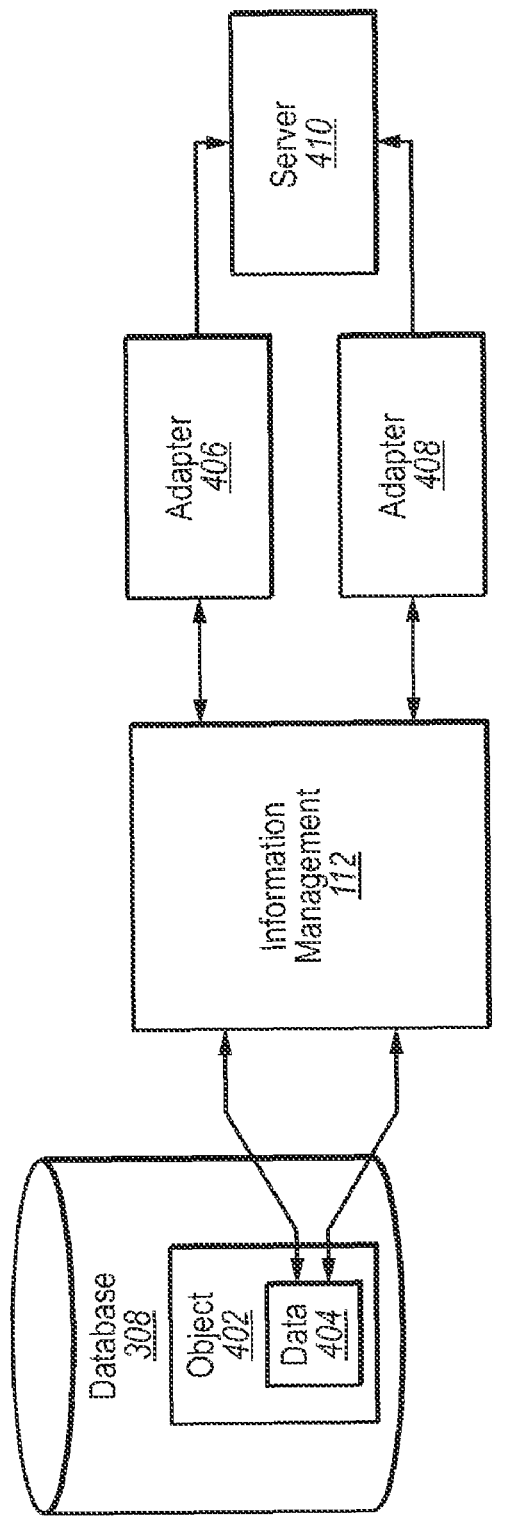
FIG. 4 illustrates an embodiment of information management that uses multiple adapters to discover and accumulate data describing an environment object such as a server.

FIG. 2 is a block diagram illustrating general concepts of discovering environment objects, which is further discussed in FIGS. 3 and 4. As noted previously, the discovery of the environment or of environment objects is often the first element of information management.

FIG. 2 illustrates systems and methods for discovering an environment. In this example, the information management system 112 has access to a network 100 or may be a part of the network 100. By way of example, a file server 202, a server 204, and a service 206 are connected with the network 100. The service 100 may include an application, for example, that may include a server, a database, etc. Embodiments of the invention can classify a service 206, however, as a logical environment object. The ability to identify a file server 202, a server 204, or a service 206 enables the information management 112 to better understand the environment and may have an impact on the services provided to the environment including the network 100.

In FIG. 2, the file server 202 and the server 204 are typically located or associated with an IP address. The service 206, such as an application, may not have an IP address, but is detected in other ways. The information managements system 112 often begins discovering the environment by walking a range of IP addresses in the network 100. In this way, the information management system 112 can discover all of the devices or environment objects in the network 100 that are acting like a server.

In this example, the information management system 112 discovers the file server 202 and the server 204. Even though the storage 208 being managed by the file server 202 may have an IP address, it is not necessarily acting like a server. As a result, this aspect of the infrastructure of the network 100 may not be discovered initially.

FIG. 2 further illustrates that the information management system 112 often uses adapters 210 to discover environment objects in the network 100. While not a requirement, the adapters 210 can be specifically configured and adapted for certain types of discovery. In this example, the discovery of all environment objects on the network 100 that are acting like a server can be discovered using an adapter 210 that may be configured to identify objects that act like a server.

In this example, the information management system 112 can discover environment objects that may include, but are not limited to, file servers, backup systems, email systems, and the like.

FIG. 3 illustrates additional details regarding the discovery of a network. FIG. 3 illustrates an environment discovery module 306 that is part of an information management system. The discovery module 306 has access to a database 308 that is used to store information that is collected about environment objects in the network. In this example, a network module 312 has access to the network 100 and may be able to perform certain actions related to discovery of the network. The environment discovery module 306 communicates with the module 312 through an adapter 310. In one embodiment, the adapter 310 abstracts the discovery of a network.

Advantageously, the discovery module 306 is not required to have a complete understanding of all types of environment objects. The adapters enable the discovery module 306 to collect the necessary information. In effect, the adapters provide a common strategy for interacting with various modules and services that can provide information about the environment objects.

FIG. 3 also illustrates adapters 302 and 304 that are different from the adapter 310. The adapters 302 and 304 are typically enabled to collect different types of data or more specific types of data.

FIG. 4 provides another illustration of the use of adapters to discover a network. In this example, the information management is using the adapter 406 and the adapter 408. The adapter 406 has the ability to interact with a module that can discover devices that operate as a server. In this example, the adapter 406 is used to discover the server 410 on the network. The information management system 112 receives this information from the adapter 406 and stores the information as data 404 in an object 402 of the database 308.

The adapter 408 is associated with another module that may provide a compatibility database that enables, for example, compatibility of the server 410 to be identified. This information received through the adapter 408 is added to the data 404. In this manner, the information management system 112 begins to collect information that enable the network to be discovered in a manner that can later be used to provide services that may include, but are not limited to, backup, retention, encryption, secure storage, tiered storage, file migration, disaster recovery, operational recovery, and the like or any combination thereof.

For example, the server 410 may be a back up server that backs up data on the network. The adapter 406 may only be able to discover that the server 410 is acting like a server. The adapter 406, however, is unable to determine that the server 410 is a backup server. The adapter 408 may be able to determine that the server 410 is compatible with a particular operating system. This enables the information management system to collect additional information from the server 410 that can be stored in the data 404.

Alternatively, the adapter 408 may be specifically designed for the server 410. For example, the server 410 may be a gateway to a storage system such as a NAS server. The adapter 408 is an adapter specifically targeted to the NAS server. As a result, the adapter 408 may be able to discover additional information that may include, but is not limited to, firmware version, type of storage, IP addresses of storage devices, tiered storage capabilities, and the like or any combination thereof.

The discovery of the network can provide a substantial benefit to the information management system when it comes time to identify services and to orchestrate those servers. For example, by discovering that a backup server provides tiered storage, or by determining the amount of storage available, etc., the backup services can be allocated appropriately. Thus, files or objects that are categorized as requiring second tier storage or lower priority storage can be stored accordingly while files requiring first tier or high priority services can also be stored accordingly.

Advantageously, the cost incurred by an entity for certain services can be managed more effectively because the entity's data is being provide with services that are actually required. Thus, an entity is not necessarily charged for services that are not required. At the same time, the entity can be assured that it s receiving the services that it actually needs.

In another example, part of the discovery of the environment also includes discovery of services. The discovery of services can also involve the use of adapters. For example, a payroll application often involves a software aspect (people management) and hardware (database). An adapter can be used to identify tables and log files in a database that are consistent with the software application. Next, communications to the database can e examined to identify the types of queries or to examine the headers of the communications. This information together can enable the information management service to identify the various communicating components and to present the application as an environment object of the network. For example, when particular tables of the database are know to be part of a payroll application, then they may be backed up more frequently, retained for some period of time, encrypted if they contain personal data, and the like.

As illustrated able, the discovery of a network results in the collection of data that can be used by an information management system as it categorizes objects (including environment objects) and determines services levels for those objects.

In another embodiment of the invention, the discovery module or the discovery portion of information management can attempt to collect more information from environment objects by simply attempting to communicate using various protocols. If an environment object does not respond to a particular call or to the use of a particular adapter, then another can be tried.

In another embodiment, information gleaned from one adapter can be used to select the next adapter. For example, a server operating on a network may be identified as a Windows device. In this case, a windows adapter can then be tried to collect additional information. If the windows device reveals that the server is an email server, then the appropriate adapter for that type of email server can be used to collect additional data.

Figure 5:
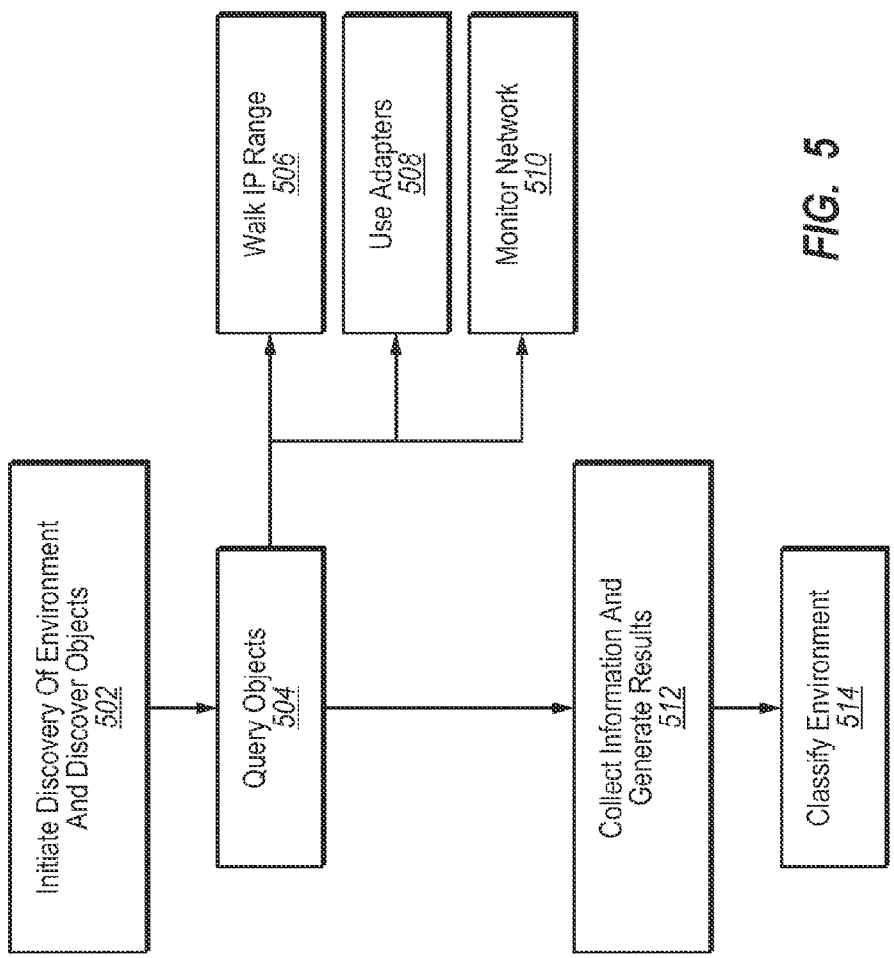
FIG. 5 illustrates an exemplary architecture for information management in a network environment.

FIG. 5 illustrates one embodiment of a flow diagram for discovering a computing environment. As previously mentioned, the computing environment can be a stand alone computer, a local area network, a wide area network, peer to peer networks, remotely connected networks, and the like or any combination thereof.

The discovery of an environment often forms the basis for further discovery of objects such as data or files. Further, because objects such as data and files tend to change more frequently than the underlying hardware, software, and services, environment discovery can be performed less frequently or when a detected change triggers discovery of the environment (such as the addition of a server, change of a server, or removal of a server computer in a network).

In FIG. 5, environment discovery is initiated 502. The initiation of discovery is not limited to situations where a network is initially being set up, but also extends to environments where the networks are already operating and where there are a substantial number of objects already present and being used. The initiation of discovery can refer to the process that begins information management. This process provides an understanding of the computing environment that can have an impact on what services are provided. For instance, the discovery of a server or service that provides tiered storage can enable the information management system to designate tiered services to the discovered data.

Once discovery is initiated, objects are discovered, for example, by querying 504 the computing environment. The query of a computing environment does not require the information management system to query a specific object, although embodiments of the invention contemplate this type of action. For instance, the information management system can walk 506 the IP address range of the computing environment to discover objects connected with the computing environment as well as to identify how those objects act or respond to queries.

Some of the objects may act like servers and respond to the query. This enables the information management server to determine that an object is on the network and acting like a server. The information management system may also use adapters 508 to query objects in the computing environment. For example, a first query using a particular adapter may enable the discovery of s server. This enables the information management to ascertain IP address, determine whether the IP address is static or dynamic, and the like. Another adapter may enable the information management system to discover whether the server is an email server, a database server, a file management server and the like. This type of information can be later used to select specific adapters for further discovery.

In one embodiment, the adapters used to discover the computing environment can be provided by the information management system itself or from third parties. These adapters may also be specifically configured to collect specific information. For instance, an adapter may be specifically configured to collect information from a specific type of back up server. This information can include, by way of example only, firmware version, configuration, storage capacity, types of storage, manufacturing data, and the like or any combination thereof.

The adapters can each be specifically prepared to enable the information management system to interface and interact with various aspects of the network. As mentioned previously, one adapter may enable the system to discover IP devices on the network that are acting like servers. Another adapter may enable the system to discover more information about specific types of network attached storage (NAS). Another adapter may enable the system to example or watch the network in order to discover services. For example, if a particular NAS has its own adapter, it can typically collect more information than what can be collected by a generic adapter. Further, the specific adapter can take advantage of features in the NAS that are not necessarily available to other adapters.

In addition to using adapters as described above, querying objects may also include network monitoring 510. Monitoring a network can enable the information management system to discover relationships between devices or servers operating in a network. In particular, the network may be able to discover applications as well as the devices that are used by that application. Queries to a database from a particular server can be examined to determine what kind of queries are being made. In addition to perhaps discovering the application or service, an association between the server and the database can be discovered. More particularly, a service may provide an adapter that enables the information management system to identify the devices (servers, file systems, databases, etc.) that are used by a particular application or service. This information can be used, for example, when selecting services for the data or for the application. One of skill in the art can appreciate that many different adapters are possible. The adapters can be used by each aspect of the system.

The discovery of the network can provide a substantial benefit to the information management system when it comes time to identify services and to orchestrate those services. For example, by discovering that a backup server provides tiered storage, or by determining the amount of storage available, etc., the backup services can be allocated appropriately. Thus, files that are categorized as requiring second tier storage or lower priority storage can be stored accordingly while files requiring first tier or high priority services can also be stored accordingly.

Advantageously, the cost incurred by an entity for certain services can be managed more effectively because the entity's data is being provide with services that are actually required. Thus, an entity is not necessarily charged for services that are not required. At the same time, the entity can be assured that it s receiving the services that it actually needs.

In another example, part of the discovery of the environment also includes discovery of services. The discovery of services can also involve the use of adapters. For example, a payroll application often involves a software aspect (people management) and hardware (database). An adapter can be used to identify tables and log files in a database that are consistent with the software application. Next, communications to the database can be examined to identify the types of queries or to examine the headers of the communications. This information together can enable the information management service to identify the various communicating components and to present the application as an environment object of the network. For example, when particular tables of the database are know to be part of a payroll application, then they may be backed up more frequently, retained for some period of time, encrypted if they contain personal data, and the like.

As more information is discovered or collected from the environment objects by the adapters, the information management can perform better classification as part of the process of generating results 512. Thus, the results that are collected can be used to classify 514 the computing environment. Classification can be performed automatically by default classification rules, using user defined rules, or in other manners. During classification, each environment object is typically assigned one or more categories that can be used when assigning service levels. For example, a backup server can be assigned to a category of general backup services, tiered storage, data retention, encryption, and the like. In this manner, by way of example only, data that requires first tier encrypted storage can receive the requisite service because the backup server was discovered appropriately and is thus available.

For example, a backup server may be classified as an object that can provide backup services for certain types of data. If it is discovered that the backup server supports or provides tiered storage, then this classification can be used to provide tiered storage. Advantageously, the more information that is collected, the better that information management is able to allocate and assign services. Using the tiered storage capabilities of a backup server rather than simply using the backup server as general storage provides a tangible result to the user in terms of cost and in terms of providing the services in the correct level as opposed to too much protection or too little protection.

The information management system may also include an adapter manager that provides an interface between the adapters and the system. The adapter manager can abstract the interface between the system and the adapters such that adapters can easily be accommodated by the system.

The discovery portion of the system uses the adapters to discover the infrastructure and the other objects of the network. The discovery portion, for example, may use a particular adapter to discover information about a backup server. The discover portion may also use other adapters to discover the same backup server. All of the information collected through the adapters can be combined or correlated.

Figure 6:
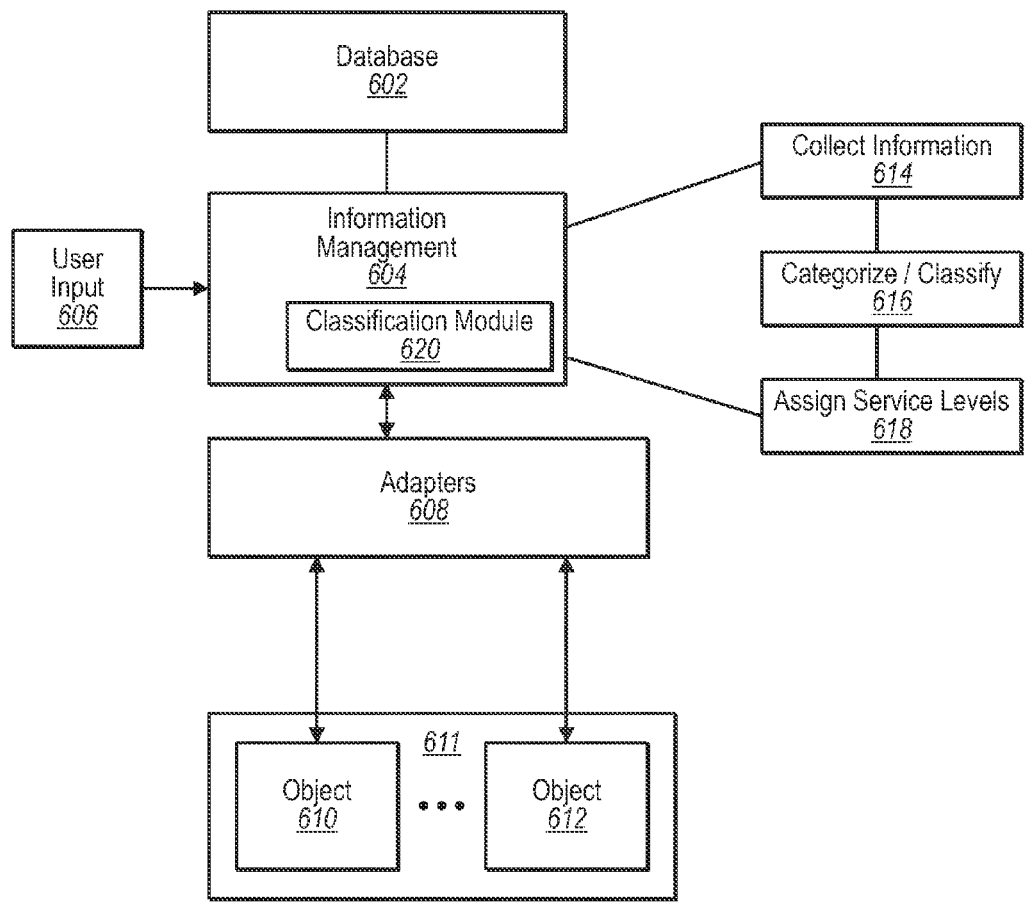
FIG. 6 illustrates another embodiment of information management for using environment classification when identifying and/or assigning service levels in the computing environment.

FIG. 6 illustrates another embodiment of information management. More particularly, FIG. 6 illustrates one embodiment of a classification process that can be applied to the information or metadata discovered about environment objects. The classification process allows information management to assign or infer service capabilities for discovered environment objects. Further, the classification process identifies the service levels that can be provided by a computing environment.

At the same time, the service levels currently being provided can also be identified and evaluated. This provides an owner or entity with a better understanding of services that are currently being received or implemented. This reporting aspect can enable an owner, for example, to make decisions regarding service levels to implement as well as better understand the existing services.

The discovery and classification of environment objects enables information management to set up a language of service levels. This language of available service levels enables an owner to understand more easily the services that are being provided. In other words, an owner is assured the services being provided without having to comprehend the technical aspects of the actual environment object.

As previously described, the information management system 604 uses adapters 608 to query or to discover the environment objects 610 and 612. These objects represent, as described herein, servers, services, applications, and the like or any combination thereof. The objects 611 can also represent groups of objects, data, and the like. The information management system 604 may also have access to a database 602 that is used to store and/or process the information collected from the objects 611.

The discovery of the objects 611 is used to ascertain or collect available information as described previously. Often, the collected information is referred to as metadata or properties. Once the information is collected, the objects 611 can be categorized as part of a classification process. The categorization of a particular object can be dependent on a variety of different input. Although not required, user input 606 can be used as part of the classification process. User input 606, for example, may be used to specifically classify certain objects.

The collected information, such as model, firmware version, configuration (a server built on specific types of storage devices, for example), and the like can be used to categorize environment objects 611. A backup server may be categorized using the type, firmware version, storage capability, manufacturer, and the like. The collected information is often used to derive category assignments rather than be considered as categories per se, although some of the collected information may be considered to be a category.

For example, the discovery of an environment object may include the manufacturer, firmware version, and the like. The information management system may then identify the object as an HSM (hierarchical storage management) server and the collected metadata can be used to categorize the HSM server as "supporting content addressable storage". For example, the firmware version may be the determining factor that identifies whether or nor content addressable storage is supported. In another example, a file server can be categorized as supporting encryption or indexing using the collected metadata.

More generally, the categorizations can be related to functions, formats, configurations, networks, operating systems, redundancy, capabilities, schedules, and the like in addition to specifics such as firmware version, manufacturer, and the like. Illustrative examples of categories may include "high speed storage device" or "mirrored storage device". These categories can then be used to classify the environment objects and are useful in determining the service levels available from a particular server.

With regard to the configuration of an environment object, the collected information typically includes information related to the hardware and/or software aspects of the configuration. For example, the configuration of a discovered backup server may include or identify that the backup server is a secured backup server. The configuration may also identify the backup schedules implemented by the backup server. The schedules can vary, for example, and may be different or established for different file shares or for different file lists. More generally, the configuration can identify what is backed up, when it is backed up, where it is backed up, and the like.

One goal of discovery and/or of classification is to identify the service levels that a particular object can provide. For example, a discovery of the environment identifies a HSM system that is associated with storage that can provide tiered storage. This information enables the information management system to include tiered storage in the service levels. This allows the capabilities of the discovered object to be used in a more efficient manner. In this manner, the discovery of environment objects enables information management to provide services that are actually available in a computing environment.

In another example, an owner may desire to have certain data objects receive services that include tiered storage and content addressable storage. The categories can then be searched based on these requirements to provide a classification to those objects able to meet these needs. The identified service level may then include these objectives.

In another example, the categorization or classification 616 of a computing environment using a classification module 620 may include the use of rules. The rules are typically applied to the collected information 614. For example, the rules can be used to determine that a particular object is a file server and that the file server has a particular type of storage. The file server can then be classified as providing certain service levels. Similarly, applying rules to a discovered backup or HSM server may include identifying the type of storage used or associated therewith, the backup schedule, and the security. These rules can be used to classify the backup server as providing certain service levels.

In another embodiment, the classification of an object entails the use of categories. Categories are often a useful intermediary step that facilitates classification as described herein. Embodiments of the invention automate the process of categorization and classification using the discovered information. At the same time, some of the automated process can be driven by system provided rules and/or by user provided rules. A user, for instance, can set up rules so that the information is categorized in a particular way. The user provided rules can further be used to indicate that certain categories or sets of categories imply specific services and levels.

For example, when an object is assigned to a particular group of categories, then that object may be able to provide certain services. This classification can be automatically performed using the rules provided by the information management system and/or by a user. For example, if the categories assigned to an environment object include a certain configuration of model, firmware version, and software configuration, then the environment object is classified as being able to provide a particular service or service level. In some embodiments, the specific sets of categories needed for an object to be classified in a particular service level or as providing a particular service can be set by default and/or by a user. In either case, the classification is typically performed automatically once the rules are set.

Advantageously, the discovery and classification process can enhance the capability of a computing environment to provide services. Thus, only the service levels actually available may be offered for the data. In this manner, the entity or owner of the data in the computing environment has a better understanding of what services are being provided. An entity can then have the ability to add hardware, software, and the like in order to ensure that the entity's data is receiving the proper services if necessary. Alternatively, the entity can utilize the available services more efficiently.

Embodiments of the invention also extend to the ability to identify the types of services currently being provided. An entity, for example, may be using a HSM server to migrate files to storage devices. The discovery of that HSM server may reveal that the tiered storage is not being used as such or that certain data is receiving the incorrect level of storage. The discovery of the HSM server, more typically, can identify what type of tiered storage is available. This in turn allows the service levels to be identified in a manner that enables a user to make better decisions about how data is stored.

Environment discovery can also be used to report on the computing environment in addition to being used to identify service levels and assign service levels to data objects. The discovery of the HSM server can be used to generate a report that may indicate that the user's data is receiving the wrong type of storage. For example, existing data may be receiving tier one storage instead of tier two storage. Advantageously, discovery of the environment and reporting on the discovered objects can enable the user (or owner of the data) to understand the actual services being received. With this type of information, the user is enabled to change the service levels that the data receives or at least be aware of the services being provided to the data. This type of report can be useful in various situations. For example, the owner may be required to meet regulatory standards or corporate requirements for certain data. Discovery of the environment can enable the user to select the correct service level that is most appropriate based on the services that the computing environment can actually provide. Discovery of the environment assists in ensuring that the user selects a best fit of service for specific data when an exact match is not necessarily available.

This reporting aspect of information management enables an owner of the data and/or the computing environment to address needs and better allocate resources. An owner, for example, may need to upgrade the computing environment in order to make it possible to provide certain services. Alternatively, the owner may discover that costs can be reduced by taking advantage of tiered storage that is available in the computing environment.

In sum, environment discovery typically begins by collecting information 614 (e.g., metadata or properties) from environment objects. Once the information is collected, the environment objects are classified 616. Finally, service levels can be assigned 618 according to the capabilities of or the services available in the discovered computing environment. In some instances, reporting is also available to enable an owner to understand computing resource allocation in an existing configuration.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing environment, a method for discovering environment objects in the computing environment to provide information management, the method comprising:

querying the computing environment to discover and collect information about the environment objects in the computing environment by an information management system, wherein the information management system is configured to identify services for data objects stored in the computing environment and orchestrate performance of the services for the data objects, wherein querying the computing environment includes:

walking IP addresses in the computing environment to at least discover which of the environment objects act like servers, wherein which environment objects act like servers is included in the collected information;

using one or more adapters that interface with an information management system and with the computing environment to identify the environment objects in the computing environment and/or collect the information environment objects, wherein some of the one or more adapters are configured to collect specific data from the environment objects, wherein the specific data is included in collected information; and monitoring the computing environment to discover relationships between the environment objects, wherein the environment objects in the computing environment include at least one of servers and services and applications operating in a network included in the computing environment, wherein information about the relationships is included in the collected information;

providing the collected information to the information management system, wherein the collected information is stored in a database by the information management system, wherein the collected information identifies at least hardware in the computing environment, software operating in the computing environment, a hardware configuration of the hardware, a software configuration of the software, and relationships between the software and the hardware or between software or between hardware; and generating results from the collected information stored in the database, wherein the results enable the information management system to assign service levels to the data objects in the computing environment based on the information collected from the environment objects, wherein the services are provided to the data objects according to the assigned service levels.

2. The method of claim 1, further comprising initiating discovery of the environment objects when an event is detected in the computing environment.

3. The method of claim 1, wherein querying the computing environment further comprises walking the IP addresses with a first adapter and monitoring the computing environment with a second adapter, the first and second adapters included in the one or more adapters.

4. The method of claim 1, further comprising collecting compatibility information for the discovered environment objects using a third adapter that uses data collected by other of the one or more adapters to collect the compatibility information.

5. The method of claim 1, further comprising using a fourth adapter to collect collecting information that includes one or more of, firmware version, type of storage, IP addresses of storage devices, tiered storage capabilities, or any combination thereof.

6. The method of claim 1, wherein querying the computing environment further comprises discovering applications operating in the computing environment.

7. The method of claim 1, further comprising classifying the discovered environment objects by assigning one or more categories to each environment object.

8. The method of claim 2, wherein initiating discovery further comprises detecting the event, wherein the event is one or more of a change in hardware or software to the computing environment.

9. The method of claim 6, further comprising assigning the service levels to the data objects in the computing environment based on the categories assigned to each environment object.

10. The method of claim 8, further comprising determining whether the servers are one of email servers, backup servers, file servers, or application servers.

* * * * *